United States Patent
Ishikawa

(10) Patent No.: US 10,483,815 B2
(45) Date of Patent: Nov. 19, 2019

(54) ROTOR, ELECTRIC MOTOR, COMPRESSOR, AND REFRIGERATION AIR CONDITIONER

(71) Applicant: Mitsubishi Electric Corporation, Tokyo (JP)

(72) Inventor: Atsushi Ishikawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 299 days.

(21) Appl. No.: 15/558,598

(22) PCT Filed: Jul. 15, 2015

(86) PCT No.: PCT/JP2015/070261
§ 371 (c)(1),
(2) Date: Sep. 15, 2017

(87) PCT Pub. No.: WO2017/009969
PCT Pub. Date: Jan. 19, 2017

(65) Prior Publication Data
US 2018/0083502 A1    Mar. 22, 2018

(51) Int. Cl.
*H02K 1/27* (2006.01)
*H02K 1/02* (2006.01)
*F04B 35/04* (2006.01)

(52) U.S. Cl.
CPC .............. *H02K 1/276* (2013.01); *H02K 1/02* (2013.01); *F04B 35/04* (2013.01); *H02K 2207/03* (2013.01)

(58) Field of Classification Search
CPC .......... F04B 35/04; H02K 1/02; H02K 1/276; H02K 2207/03; H02K 2213/03;
(Continued)

(56) References Cited

U.S. PATENT DOCUMENTS

| 9,178,392 B2 | 11/2015 | Yabe et al. |
| 9,496,759 B2 | 11/2016 | Yabe et al. |

(Continued)

FOREIGN PATENT DOCUMENTS

| CN | 103891102 A | 6/2014 |
| JP | H09-084285 A | 3/1997 |

(Continued)

OTHER PUBLICATIONS

Office Action dated Dec. 24, 2018 in the corresponding CN patent application No. 201580079218.3 (and English translation).
(Continued)

*Primary Examiner* — Jue Zhang
*Assistant Examiner* — Demetries A Gibson
(74) *Attorney, Agent, or Firm* — Posz Law Group, PLC

(57) ABSTRACT

A rotor includes an iron core that assumes a cylindrical or columnar shape, and a plurality of magnets embedded in the iron core and equiangularly arranged with respect to an axis of the iron core. The iron core includes a first end surface portion, a second end surface portion, and a central portion disposed between the first end surface portion and the second end surface portion. Each of the first end surface portion, the second end surface portion, and the central portion has one or more gaps formed at positions thereof remoter from the axis of the iron core than the magnets. A third cross-sectional planar dimension of the central portion is greater than a first cross-sectional planar dimension of the first end surface portion and a second cross-sectional planar dimension of the second end surface portion.

8 Claims, 10 Drawing Sheets

(58) Field of Classification Search
CPC ...... H02K 29/03; H02K 7/14; H04R 2430/01;
H04R 2499/13; H04R 27/00; H04R 3/007
USPC .. 310/156.49–156.65, 156.83–156.84, 49.42
See application file for complete search history.

(56) References Cited

U.S. PATENT DOCUMENTS

| | | | | |
|---|---|---|---|---|
| 9,692,264 | B2* | 6/2017 | Yabe | H02K 1/276 |
| 9,923,423 | B2* | 3/2018 | Brahmavar | H02K 21/16 |
| 2006/0273678 | A1* | 12/2006 | Futami | H02K 1/276 |
| | | | | 310/156.53 |
| 2007/0138893 | A1* | 6/2007 | Son | H02K 1/223 |
| | | | | 310/156.83 |
| 2008/0018190 | A1* | 1/2008 | Takahata | H02K 1/276 |
| | | | | 310/156.56 |
| 2008/0224558 | A1* | 9/2008 | Ionel | H02K 1/276 |
| | | | | 310/156.57 |
| 2012/0242182 | A1* | 9/2012 | Yabe | H02K 1/276 |
| | | | | 310/156.53 |
| 2013/0140922 | A1* | 6/2013 | Yabe | H02K 1/2706 |
| | | | | 310/51 |
| 2014/0232231 | A1* | 8/2014 | Yabe | H02K 1/276 |
| | | | | 310/156.51 |

FOREIGN PATENT DOCUMENTS

| | | |
|---|---|---|
| JP | 2000-116044 A | 4/2000 |
| JP | 3722126 B2 | 9/2005 |
| JP | 2009-219291 A | 9/2009 |
| JP | 2010-081776 A | 4/2010 |
| JP | 5414900 B2 | 11/2013 |
| JP | 2014-079068 A | 5/2014 |
| WO | 2008/113082 A1 | 9/2008 |

OTHER PUBLICATIONS

Extended European Search Report dated Feb. 13, 2019 issued in corresponding EP patent application No. 15898281.9.
International Search Report of the International Searching Authority dated Sep. 29, 2015 for the corresponding international application No. PCT/JP2015/070261 (and English translation).

* cited by examiner

ROTOR, ELECTRIC MOTOR, COMPRESSOR, AND REFRIGERATION AIR CONDITIONER

CROSS REFERENCE TO RELATED APPLICATION

This application is a U.S. national stage application of International Patent Application No. PCT/JP2015/070261 filed on Jul. 15, 2015, the disclosure of which is incorporated herein by reference.

TECHNICAL FIELD

The present invention relates to a rotor having permanent magnets inserted in an iron core, an electric motor, a compressor, and a refrigeration air conditioner.

BACKGROUND

In recent years, improvement in efficiency of an electric motor tends to be needed because of the increased awareness of saving energy. To meet this need, an electric motor that improve the efficiency by using the rotor having the permanent magnets inserted in the iron core, has been proposed. In this electric motor, a torque ripple and an exciting force in the radial direction during the operation of the motor may increase because of an influence of a portion of the iron core on an outer peripheral side of the inserted permanent magnets. The torque ripple is pulsation caused by a change in the behavior of torque during the operation. The torque ripple causes vibration and noise, and it is therefore necessary to reduce of the torque ripple, as well as to improve the efficiency. In Patent Literature 1, a plurality of slits that are gaps is arranged at the portion of the iron core on the outer peripheral side of the inserted permanent magnets to thereby reduce the torque ripple.

PATENT LITERATURE

Japanese Patent Publication No. 5414900

However, the arrangement of such slits poses a problem because the arrangement causes reduction of a magnetic force and reduction of the torque, which deteriorates the motor efficiency.

SUMMARY

The present invention has been achieved in view of the above problem, and an object of the present invention is to provide a rotor that forms gaps to thereby reduce the torque ripple as well as suppressing the reduction of the torque.

To solve the above problem and achieve the object, the present invention provides a rotor comprising: an iron core that assumes a cylindrical or columnar shape; and a plurality of magnets embedded in the iron core and equiangularly arranged with respect to an axis of the iron core, the iron core comprising a first end surface portion including a first end surface of the iron core, a second end surface portion including a second end surface of the iron core opposed to the first end surface, and a central portion disposed between the first end surface portion and the second end surface portion, the plurality of magnets each penetrating through the first and second end surface portions and the central portion, the first and second end surface portions and the central portion each having one or more gaps at positions thereof remoter from the axis of the iron core than the plurality of magnets, the first and second end surface portions and the central portion having a first cross-sectional planar dimension, a second cross-sectional planar dimension, and a third cross-sectional planar dimension in a perpendicular plane to the axis of the iron core, respectively, and the third cross-sectional planar dimension being greater than any of the first and second cross-sectional planar dimensions.

The rotor according to the present invention forms the gaps to thereby provide the effect of reducing the torque ripple as well as suppressing the reduction of torque.

DETAILED DESCRIPTION

A rotor, an electric motor, a compressor, and a refrigeration air conditioner according to an embodiment of the present invention will be described below in detail with reference to the accompanying drawings. The present invention is not limited to the embodiment.

First Embodiment

Figure 1:
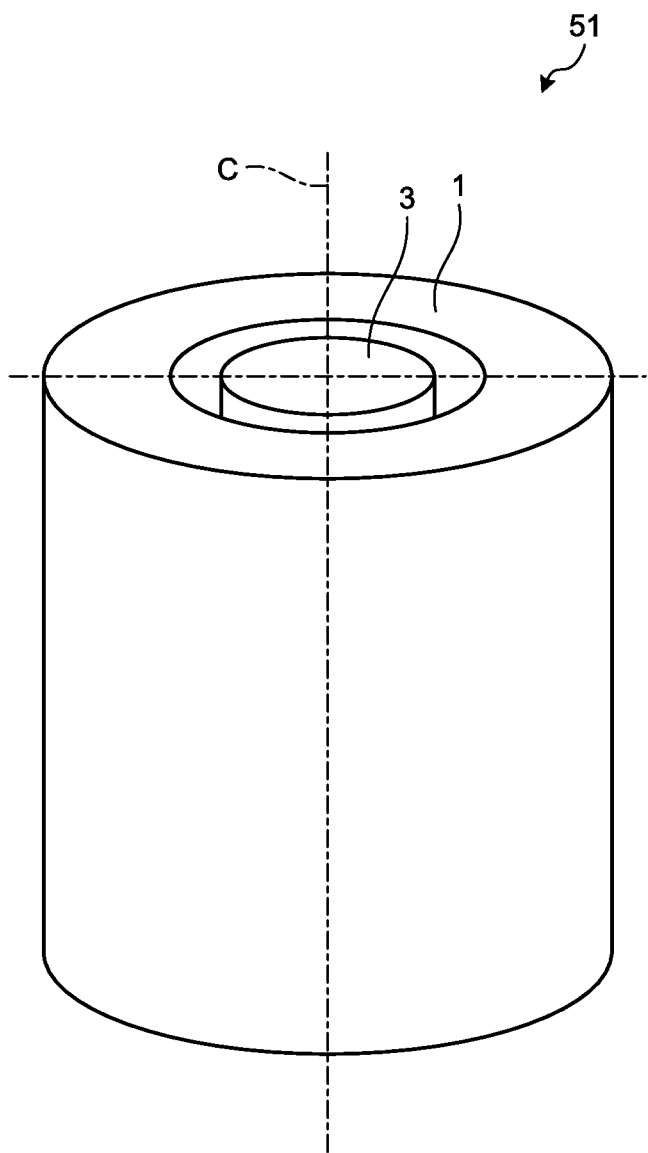
FIG. 1 is a perspective view illustrating a schematic configuration of an electric motor according to a first embodiment of the present invention.

FIG. 1 is a perspective view illustrating a schematic configuration of an electric motor according to a first embodiment of the present invention. An electric motor 51 includes a stator 1 having a tubular shape, and a rotor 3 that is provided in the inside of the stator 1 and rotates on an axis C of the stator 1.

Figure 2:
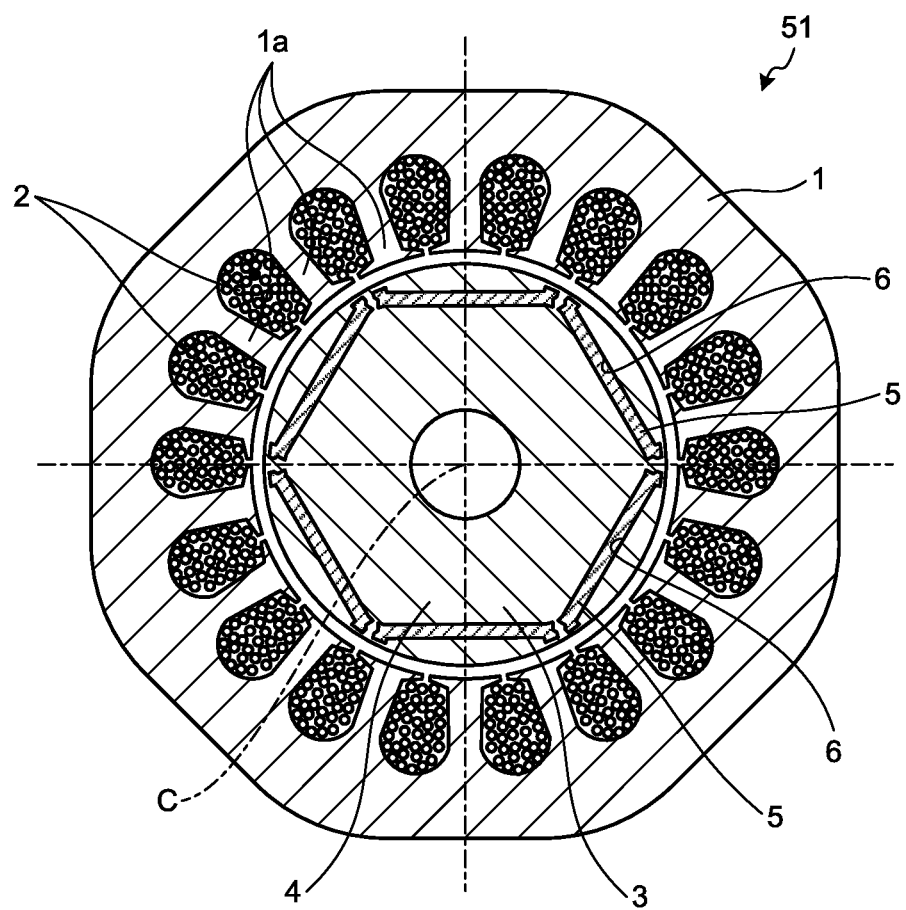
FIG. 2 is a cross-sectional view of the electric motor according to the first embodiment, taken along a plane perpendicular to an axis.

FIG. 2 is a cross-sectional view of the electric motor 51 according to the first embodiment, taken along a plane perpendicular to the axis C. The stator 1 is configured by placing windings 2 on a plurality of teeth 1a projecting to an inside of the stator 1. The rotor 3 has a cylindrical or columnar shape extending along the axis C. The rotor 3 is placed with a gap between the rotor 3 and the stator 1.

Figure 3:
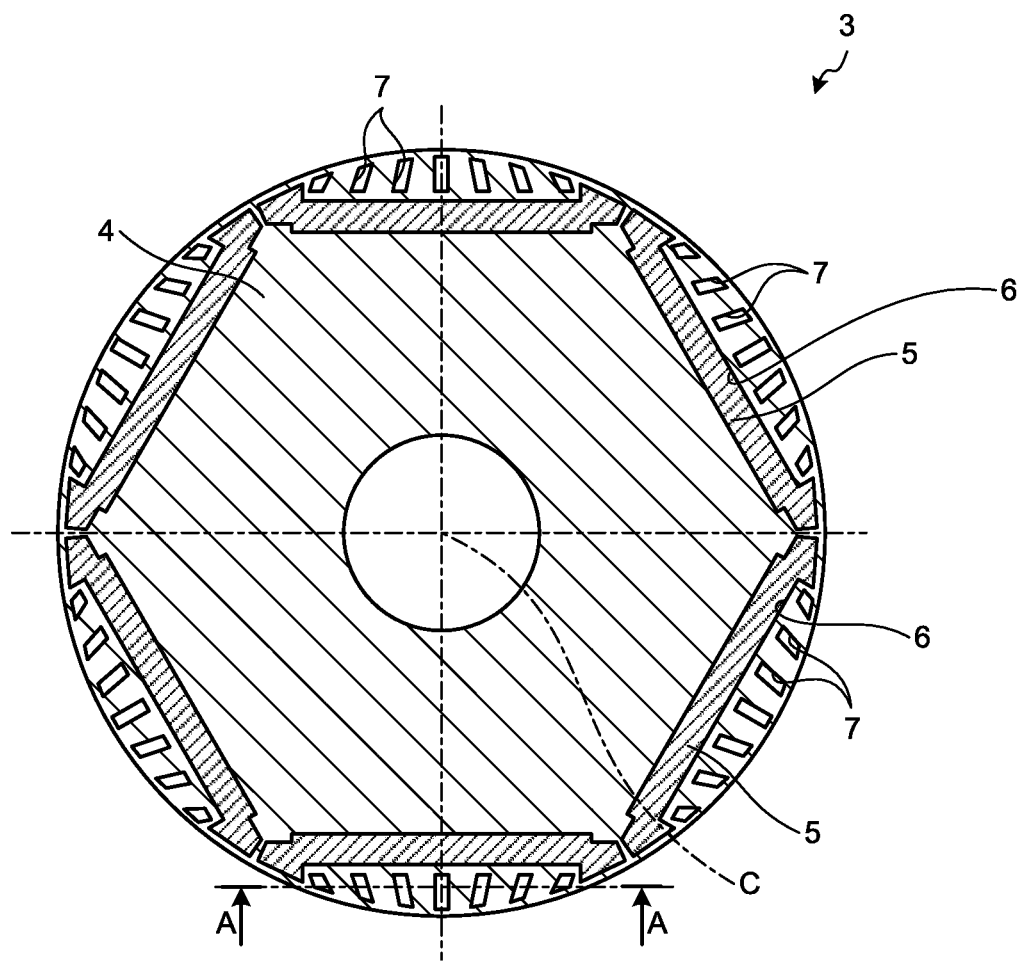
FIG. 3 is a cross-sectional view of a rotor in the first embodiment, taken along a plane perpendicular to the axis.

FIG. 3 is a cross-sectional view of the rotor 3 in the first embodiment, taken along a plane perpendicular to the axis C. The rotor 3 includes an iron core 4 that is formed by stacking a plurality of electromagnetic steel plates in a direction along the axis C. The iron core 4 assumes a cylindrical or columnar shape and forms an outline of the rotor 3. The iron core 4 has magnet insertion holes 6 formed therein, and the magnet insertion holes 6 extend in a direction along the axis C. Magnets 5 are inserted and embedded into the magnet insertion holes 6. The magnets 5 are rare-earth magnets made of mainly neodymium and dysprosium. Use of the rare-earth magnets provides a high residual magnetic flux density and a high coercive force, thereby forming a permanent-magnet-embedded electric motor that is highly efficient and is satisfactory in demagnetization resistance.

The magnet insertion holes 6, which is the same in number as poles of the electric motor 51, are formed. The six magnet insertion holes 6 are formed in the first embodiment. The magnet insertion holes 6 are formed so as to coincide chords of a circular shape, i.e., an outer circumferential shape of the iron core 4 when the iron core 4 is seen along the axis C, as illustrated in FIG. 3, and the six magnet insertion holes 6 are arranged to form a regular hexagon as a whole. That is, the magnet insertion holes 6 are equiangularly arranged with respect to the axis C. With this configuration, the magnets 5 are arranged equiangularly with respect to the axis C.

Figure 4:
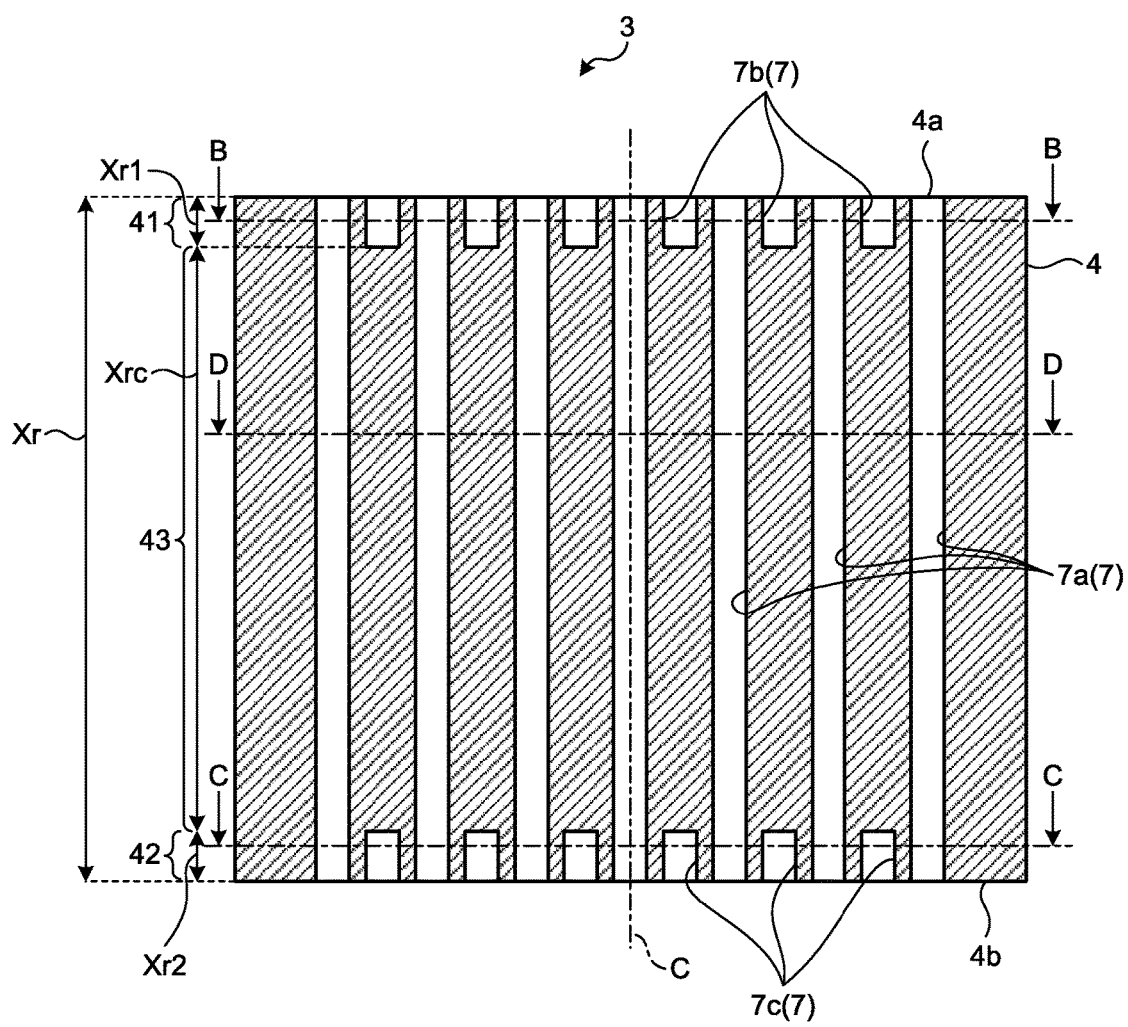
FIG. 4 is a cross-sectional view of the rotor in the first embodiment, as viewed in a direction of arrows along line A-A illustrated in FIG. 3.

The iron core 4 has one or more gaps 7 formed on an outer peripheral side of each of the magnet insertion holes 6. That is, the iron core 4 has the one or more gaps 7 formed at positions thereof remoter from the axis C than the corresponding magnet 5. The first embodiment illustrates an example in which a plurality of gaps 7 is formed. FIG. 4 is a cross-sectional view of the rotor 3 in the first embodiment, as viewed in a direction of arrows along line A-A illustrated in FIG. 3. As illustrated in FIG. 4, the gaps 7 include a plurality of first gaps 7a extending along the axis C from a first end surface 4a of the iron core 4 to a second end surface 4b of the iron core 4, a plurality of second gaps 7b extending from the first end surface 4a of the iron core 4 toward the second end surface 4b, and a plurality of third gaps 7c extending from the second end surface 4b of the iron core 4 toward the first end surface 4a. The number of the second gaps 7b and the number of the third gaps 7c are equal to each other. The second gaps 7b and the third gaps 7c are formed between the first gaps 7a. The number of gaps used in the following descriptions means the number of gaps formed per pole.

The iron core 4 is divided into a first end surface portion 41, a second end surface portion 42, and a central portion 43 along the axis C. The first end surface portion 41 is a region including the first end surface 4a and having the first gaps 7a and the second gaps 7b formed therein. The second end surface portion 42 is a region including the second end surface 4b and having the first gaps 7a and the third gaps 7c formed therein. The central portion 43 is a region provided between the first end surface portion 41 and the second end surface portion 42 and having only the first gaps 7a formed therein.

Figure 5:
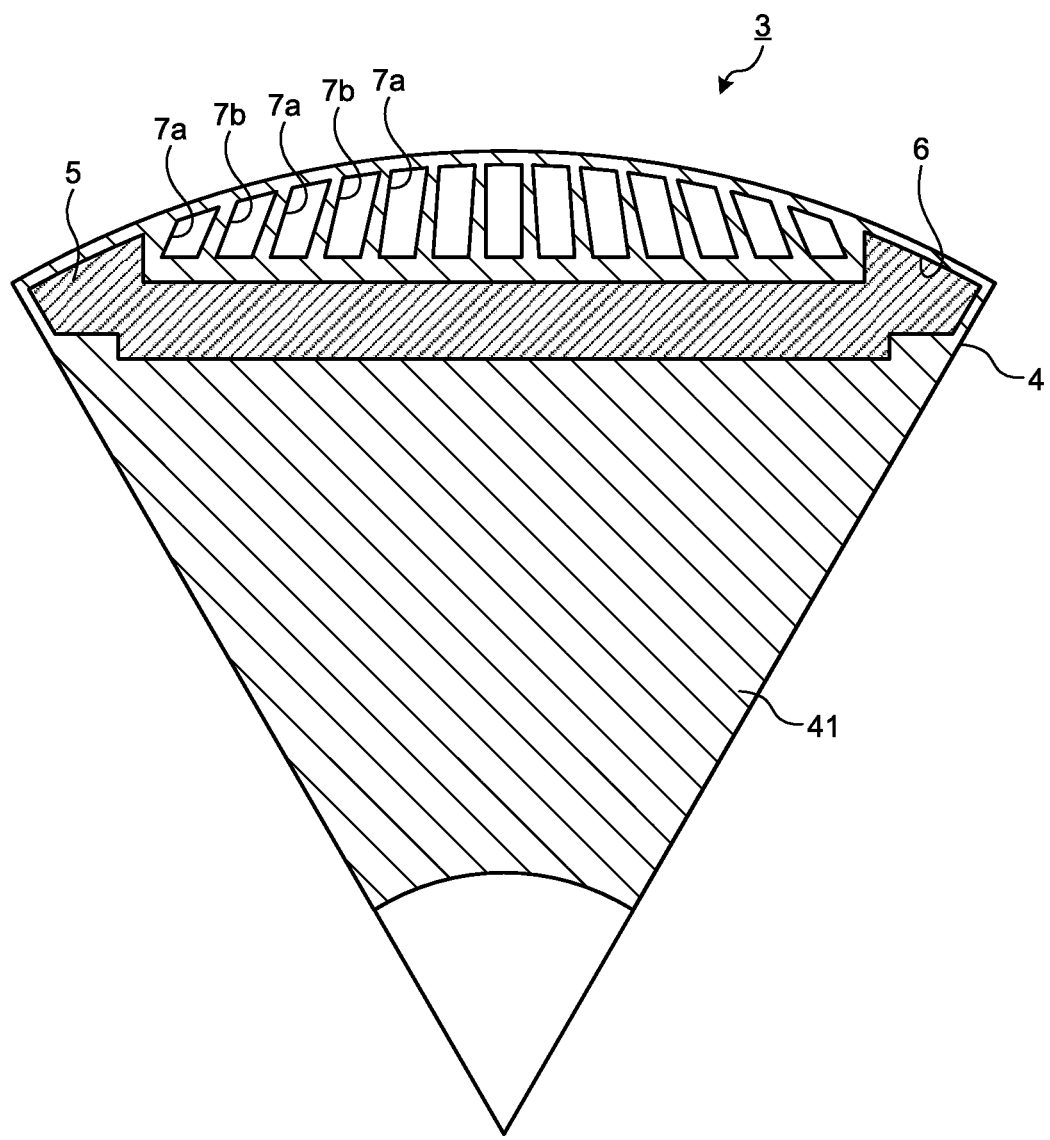
FIG. 5 is a cross-sectional view of the rotor in the first embodiment, as viewed in a direction of arrows along line B-B illustrated in FIG. 4.
Figure 6:
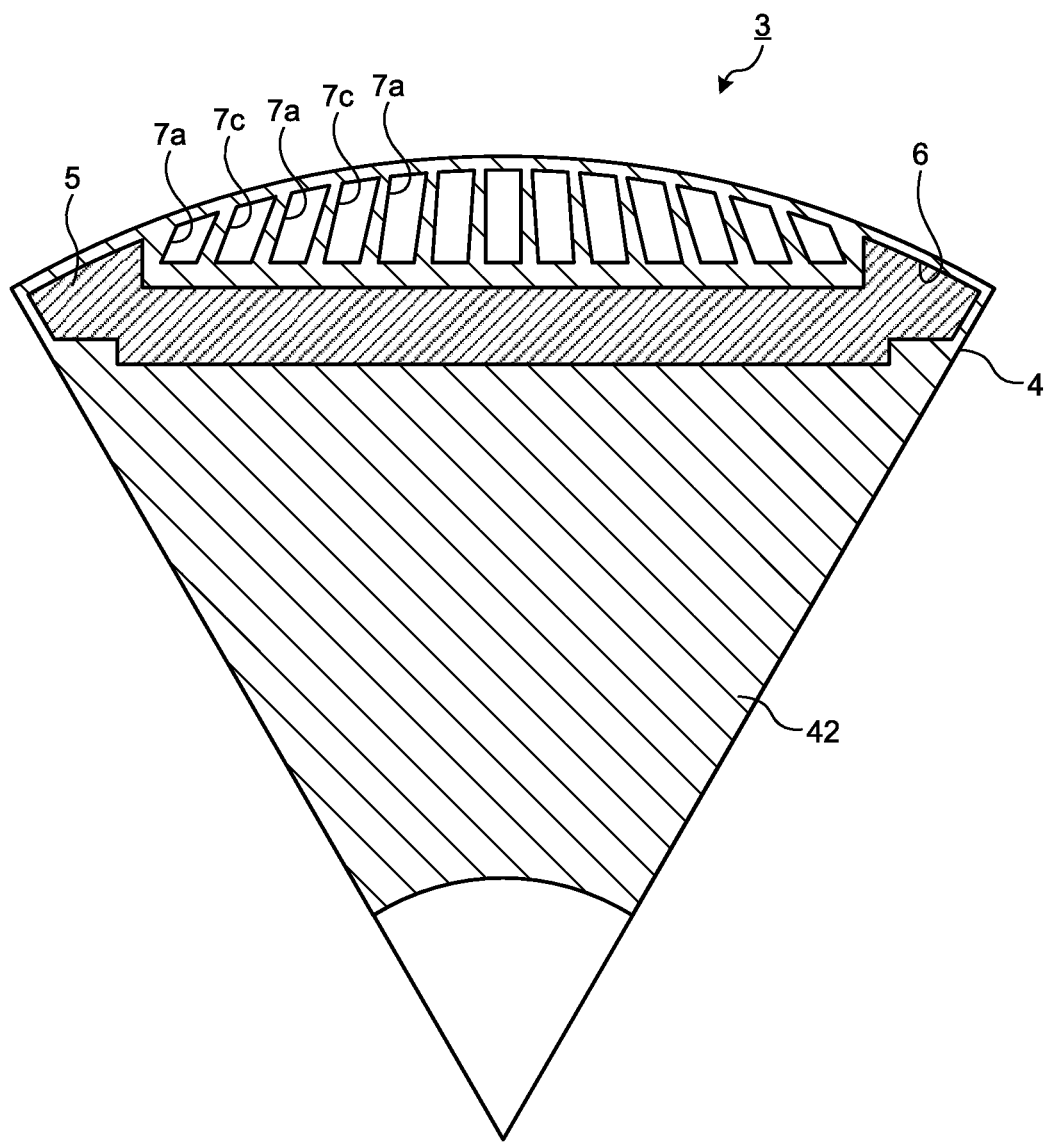
FIG. 6 is a cross-sectional view of the rotor in the first embodiment, as viewed in a direction of arrows along line C-C illustrated in FIG. 4.
Figure 7:
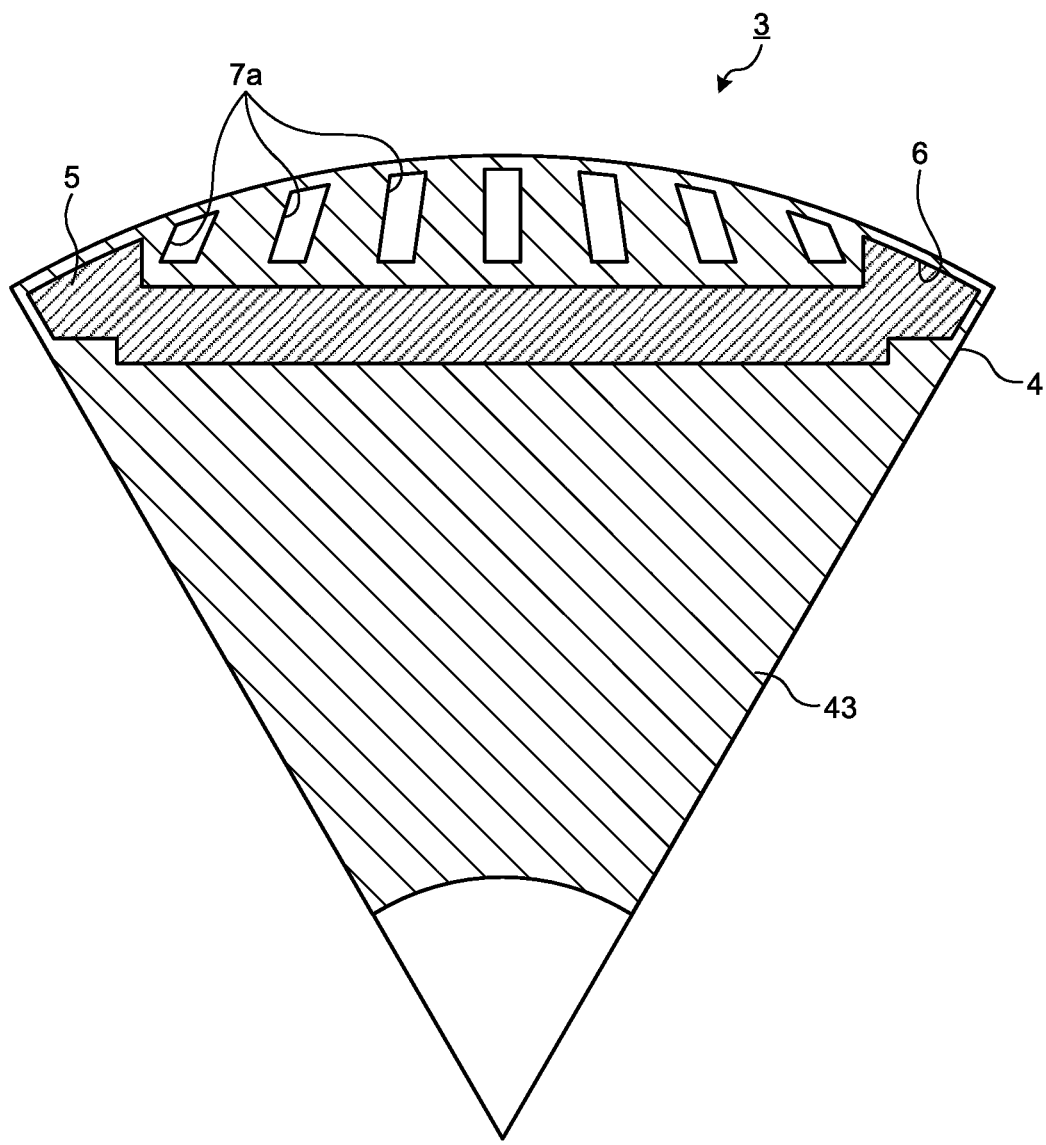
FIG. 7 is a cross-sectional view of the rotor in the first embodiment, as viewed in a direction of arrows along line D-D illustrated in FIG. 4.

FIG. 5 is a cross-sectional view of the rotor 3 in the first embodiment, as viewed in a direction of arrows along line B-B illustrated in FIG. 4. FIG. 6 is a cross-sectional view of the rotor 3 in the first embodiment, as viewed in a direction of arrows along line C-C illustrated in FIG. 4. FIG. 7 is a cross-sectional view of the rotor 3 in the first embodiment, as viewed in a direction of arrows along line D-D illustrated in FIG. 4. FIG. 5 illustrates a cross-sectional shape of the first end surface portion 41. FIG. 6 illustrates a cross-sectional shape of the second end surface portion 42. FIG. 7 illustrates a cross-sectional shape of the central portion 43. Each of FIGS. 5 to 7 illustrates an extracted region including one magnet 5. Further, the cross sections illustrated in FIGS. 5 to 7 are planes perpendicular to the axis C. Assuming that the number of the gaps 7 formed in the first end surface portion 41 is $S_1$, the number of the gaps 7 formed in the second end surface portion 42 is $S_2$ and the number of the gaps 7 formed in the central portion 43 is $S_3$ relations of $S_3<S_1$ and $S_3<S_2$ hold. In particular, $S_3<S_1=S_2$ holds in the first embodiment. That is, the first end surface portion 41 and the second end surface portion 42 both of which have more gaps 7 formed therein than those in the central portion 43 are provided on opposite sides of the central portion 43. In the first embodiment, the second gap 7b is formed between the adjacent first gaps 7a in the first end surface portion 41. In the second end surface portion 42, the third gap 7c is formed between the adjacent first gaps 7a.

Assuming that the length of the first end surface portion 41 is Xr1, the length of the second end surface portion 42 is Xr2, the length of the central portion 43 is Xrc, and the thickness of the rotor 3, that is, the stacking thickness of the iron core 4 is Xr in the direction along the axis C, the relation Xr=Xr1+Xr2+Xrc holds. In order to provide the central portion 43, it is necessary that a relation of Xr>Xr1+Xr2 holds.

Since the electric motor 51 described above has the gaps 7 formed in the rotor 3, a torque ripple can be reduced and generation of vibration and noise can be suppressed. In addition, the opposite end portions, i.e., the first end surface portion 41 and the second end surface portion 42 of the rotor 3, which have the more gaps 7 formed therein than those in the central portion 43, are so large in magnetic resistance that magnetic fluxes generated from the magnets 5 can easily concentrate to a stator core. In other words, because of the increase in the magnetic resistance in the opposite end portions of the rotor 3, magnetic fluxes leaking to the opposite end portions of the rotor 3 are suppressed to effectively use the magnetic fluxes. By suppressing the magnetic fluxes leaking to the opposite end portions of the rotor 3 to achieve effective use of the magnetic fluxes, it is possible to suppress reduction of the torque of the electric motor 51. Further, in order to suppress a leak of magnetic fluxes from the opposite end portions of the rotor 3, it is necessary that a cross-sectional planar dimension (a third cross-sectional planar dimension) of the central portion 43 illustrated in FIG. 7 be greater than a cross-sectional planar dimension (a first cross-sectional planar dimension) of the first end surface portion 41 illustrated in FIG. 5 and a cross-sectional planar dimension (a second cross-sectional planar dimension) of the second end surface portion 42 illustrated in FIG. 6. The cross-sectional planar dimension of the central portion 43, the cross-sectional planar dimension of the first end surface portion 41, and the cross-sectional planar dimension of the second end surface portion 42 are cross-sectional planar dimensions of the iron core 4 from which the magnet insertion holes 6 and the gaps 7 are removed.

Figure 8:
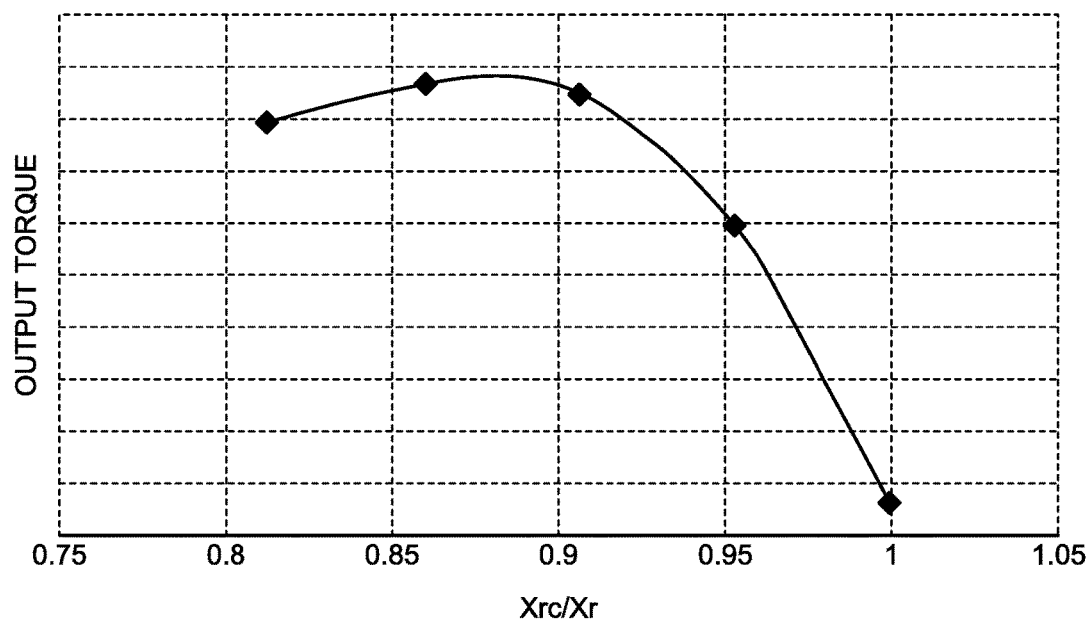
FIG. 8 is a diagram illustrating a relation between an output torque and Xrc/Xr in the electric motor according to the first embodiment when the vertical axis represents the output torque and the horizontal axis represents Xrc/Xr.
Figure 9:
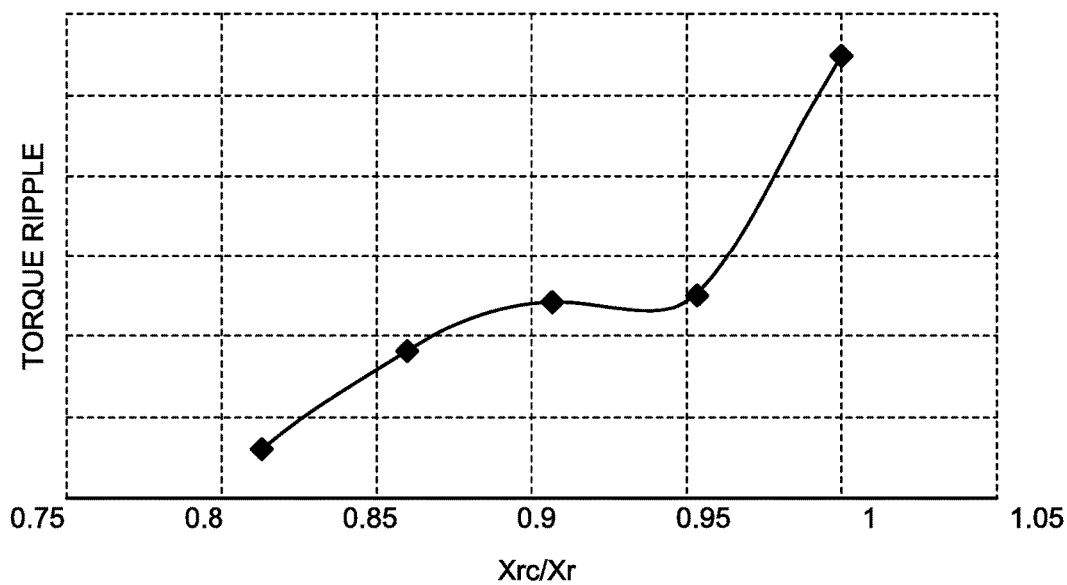
FIG. 9 is a diagram illustrating a relation between a torque ripple and Xrc/Xr in the electric motor according to the first embodiment when the vertical axis represents the torque ripple and the horizontal axis represents Xrc/Xr.

A more preferable relation between Xrc and Xr is described next from a viewpoint of suppressing a torque ripple and suppressing reduction of torque in the electric motor 51. FIG. 8 is a diagram illustrating a relation between an output torque and Xrc/Xr in the electric motor 51 according to the first embodiment when the vertical axis represents the output torque and the horizontal axis represents Xrc/Xr. FIG. 9 is a diagram illustrating a relation between a torque ripple and Xrc/Xr in the electric motor 51 according to the first embodiment when the vertical axis represents the torque ripple and the horizontal axis represents Xrc/Xr.

FIG. 8 indicates that the output torque becomes the maximum around Xrc/Xr=0.88. FIG. 9 indicates that the torque ripple tends to increase as Xrc/Xr is increased. From a viewpoint of reducing the torque ripple, it is desirable that Xrc/Xr is smaller. However, when Xrc/Xr is reduced, the output torque is reduced, as is found from FIG. 8. From the relations illustrated in FIGS. 8 and 9, therefore, it can be said that it is preferable to satisfy a relation of $0.82 \leq Xrc/Xr \leq 0.9$.

In the above descriptions, the stacking thickness Xr of the iron core 4 can be restated as the length of the first gap 7a. Also, the length Xr1 of the first end surface portion 41 can be restated as the length of the second gap 7b. The length Xr2 of the second end surface portion 42 can be restated as the length of the third gap 7c. The length Xrc of the central portion 43 can be restated as a length obtained by subtracting the length of the second gap 7b and the length of the third gap 7c from the length of the first gap 7a.

Figure 10:
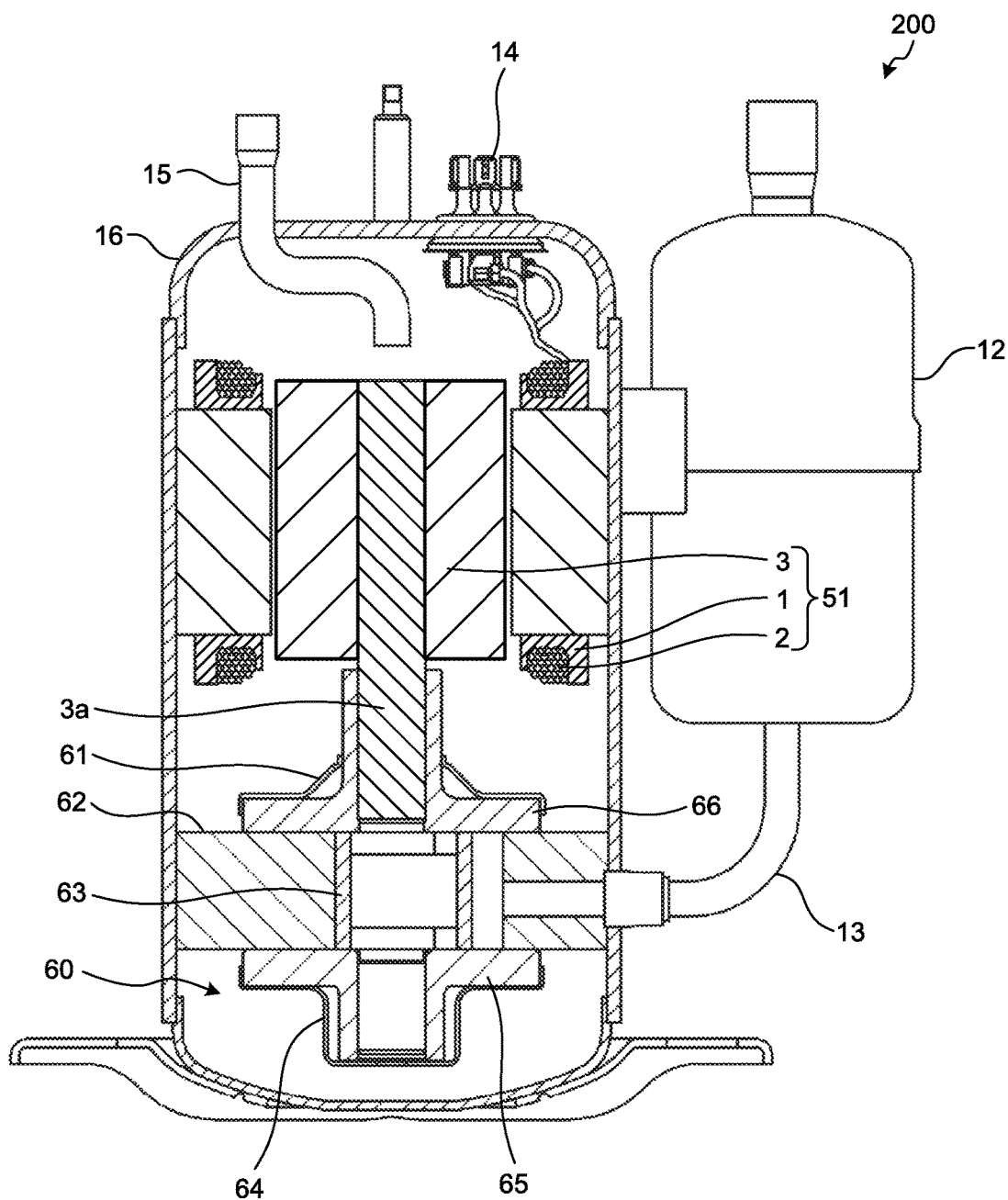
FIG. 10 is a cross-sectional view of a compressor using the electric motor according to the first embodiment.

A compressor using the electric motor 51 is described next. FIG. 10 is a cross-sectional view of the compressor using the electric motor 51 according to the first embodiment. A sealed container 16 of a compressor 200 is formed by drawing a steel plate into a cylindrical shape. The sealed container 16 is provided with the electric motor 51 and a compression unit 60. A refrigerant oil that lubricates a sliding portion of the compression unit 60 is stored in a bottom portion of the sealed container 16. A scrolling, rotary, or reciprocating mechanism is used for the compression unit 60.

The stator 1 is held on an inner circumferential portion of the sealed container 16 by shrink fitting, cool fitting, or press fitting. Power from a glass terminal 14 fixed to the sealed container 16 is supplied to the windings 2 on the stator 1.

The rotor 3 has a shaft portion 3a extending from the rotor 3. The rotor 3 is rotatable with the shaft portion 3a held by an upper frame 66 and a lower frame 65 that are bearing portions.

The compression unit 60 includes a cylinder 62 provided in a vertically stacked state, a piston 63, a pair of the upper frame 66 and the lower frame 65, an upper discharge muffler 61, a lower discharge muffler 64, and vanes (not illustrated) that separate the inside of the cylinder 62 into an intake side and a compression side. The shaft portion 3a is inserted into the piston 63. The upper frame 66 and the lower frame 65 into which the shaft portion 3a is inserted close axial end surfaces of the cylinder 62. The upper discharge muffler 61 is attached to the upper frame 66. The lower discharge muffler 64 is attached to the lower frame 65.

An operation of the compressor 200 is described. A refrigerant gas supplied from an accumulator 12 is taken into the cylinder 62 through an inlet pipe 13 fixed to the sealed container 16. Rotation of the rotor 3 caused by supply of power to an inverter causes the piston 63 fitted to the shaft portion 3a to rotate within the cylinder 62, so that a refrigerant is compressed in the cylinder 62. The compressed refrigerant that is at a high temperature passes through the upper discharge muffler 61 and the lower discharge muffler 64, then rises in the sealed container 16 through a gap between the stator 1 and the rotor 3 or through an air hole (not illustrated) formed in the rotor 3, and is supplied to a high-pressure side of a refrigeration cycle through a discharge pipe 15 provided in the sealed container 16.

By using the electric motor 51 which not only reduces the torque ripple to suppress the generation of noise and vibration but also effectively uses the magnetic fluxes to suppress the reduction of torque, it is possible to suppress noise and vibration of the compressor 200 and to improve the operation efficiency of the compressor 200.

Figure 11:
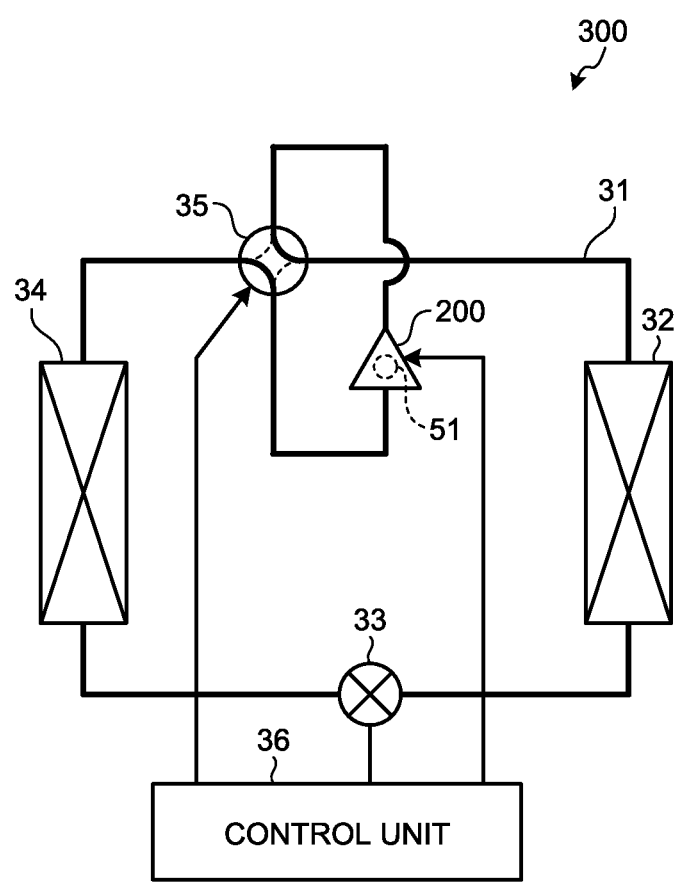
FIG. 11 is a configuration diagram of a refrigeration air conditioner configured using the compressor according to the first embodiment.

A refrigeration air conditioner using the electric motor 51 is described next. FIG. 11 is a configuration diagram of a refrigeration air conditioner configured using the compressor 200 according to the first embodiment. A refrigeration air conditioner 300 is configured by the compressor 200, a four-way valve 35, a condenser 32, an expander 33, an evaporator 34, and a control unit 36 that controls the compressor 200, the expander 33, and the four-way valve 35. The compressor 200 includes the electric motor 51. The condenser 32 effects heat exchange between air and heat of a high-temperature and high-pressure refrigerant gas compressed in the compressor 200 to condense the refrigerant gas into a liquid refrigerant. The expander 33 causes the liquid refrigerant to expand into a low-temperature and low-pressure liquid refrigerant. The evaporator 34 absorbs heat from the low-temperature and low-pressure liquid refrigerant to provide a low-temperature and low-pressure gas refrigerant. The compressor 200, the four-way valve 35, the condenser 32, the expander 33, and the evaporator 34 are mutually connected with a refrigerant pipe 31 to configure a refrigeration cycle. By using the compressor 200, it is possible to provide the refrigeration air conditioner 300 that is highly efficient and has a high output.

The use of the electric motor 51 which not only reduces the torque ripple to suppress the generation of noise and vibration but also effectively uses the magnetic fluxes to suppress the reduction of torque can suppress the noise and vibration of the refrigeration air conditioner 300 and improve the operation efficiency of the refrigeration air conditioner 300.

The configurations described in the above embodiments are only examples of the contents of the present invention. The configurations can be combined with other well-known techniques, and a part of each configuration can be omitted or modified without departing from the scope of the present invention.

The invention claimed is:

1. A rotor comprising:
an iron core that assumes a cylindrical or columnar shape; and
a plurality of magnets embedded in the iron core and equiangularly arranged with respect to an axis of the iron core,
the iron core comprising
a first end surface portion including a first end surface of the iron core,
a second end surface portion including a second end surface of the iron core opposed to the first end surface, and
a central portion disposed between the first end surface portion and the second end surface portion,
the plurality of magnets each penetrating through the first and second end surface portions and the central portion,
the iron core having a plurality of first gaps penetrating from the first end surface portion to the second end surface portion, and a plurality of second gaps formed from the first end surface portion without reaching the central portion, and the first gap and the second gap being alternately arranged.

2. The rotor according to claim 1, wherein
the iron core having a plurality of third gaps formed from the second end surface portion without reaching the central portion, and
the first gap and the third gap are alternately arranged.

3. The rotor according to claim 2, wherein the second gaps are in an opposed relation to the third gaps with the central portion being interposed between the second gaps and the third gaps.

4. The rotor according to claim 3, wherein a relation $0.82 \leq Xrc/Xr \leq 0.9$ is satisfied, where a sum of a length of the first end surface portion, a length of the second end surface portion, and a length of the central portion is Xr in a direction along the axis and the length of the central portion is Xrc in the direction along the axis.

5. The rotor according to claim 1, wherein the magnets are rare-earth magnets.

6. An electric motor comprising:
a stator having a tubular shape; and
the rotor according to claim 1, the rotor being provided inside the stator such that the rotor is rotatable on the axis of the iron core.

7. A compressor comprising the electric motor according to claim 6.

8. A refrigeration air conditioner comprising the compressor according to claim 7.

* * * * *